Patented Dec. 12, 1922.

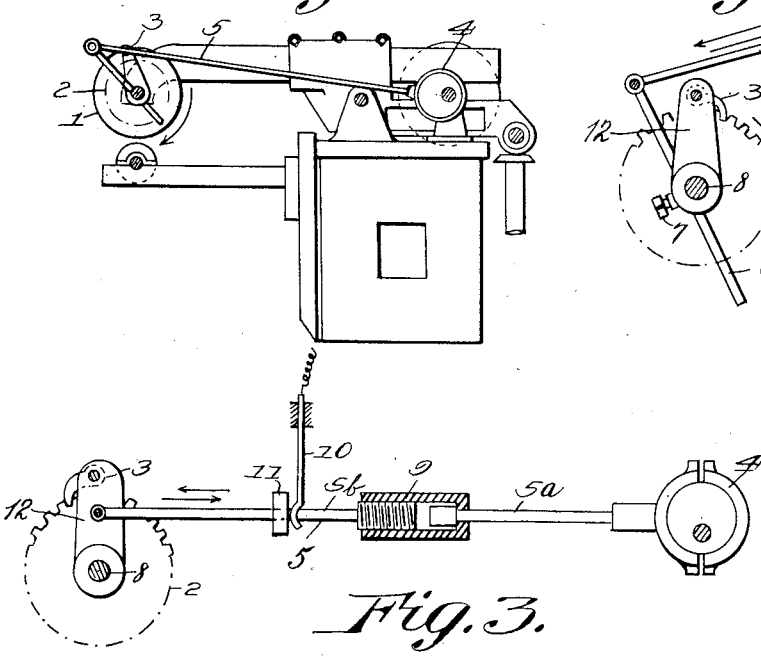

1,438,867

UNITED STATES PATENT OFFICE.

EDMUND SCHRÖDER, OF BERLIN, GERMANY.

ELECTRIC SEAM-WELDING MACHINE.

Application filed October 9, 1919. Serial No. 329,629.

*To all whom it may concern:*

Be it known that I, EDMUND SCHRÖDER, engineer, a citizen of the German Republic, residing at No. 88 Belle - Alliancestrasse, Berlin, Germany, have invented certain new and useful Improvements in Electric Seam-Welding Machines, of which the following is a specification.

The present invention consists of an electric seam welding machine and has for an object the inclusion of a roller electrode in a seam welding machine which is characterized by a step by step movement in order that the steps in the process of welding may be gradual to efficiently and effectively weld the seam without in any way distorting or weakening the latter.

A co-ordinate object of the invention is to provide a water cooled roller electrode which is operable into a welding position and a current automatically induced thereinto following which the current is automatically disconnected to permit cooling and hardening of the welded surface after which the roller progresses.

It is known in the art to provide roller electrodes in seam welding machines which rollers, however, operate at a constant speed and are so operated that any disturbance during the cycle of operation of the machine usually results in the work material being furrowed out of the seam and the material thus displaced adheres to the welding roller causing the seam to be burned through upon the succeeding revolution of the roller or else results in other disadvantages. The device of this invention positively eliminates any such undesirable performance of the machine and will be found especially beneficial in the welding of annular seams where it is not always possible to retouch the inception of the seam. Moreover, the device of this invention permits the welding of relatively thick sheets without reducing the tensile strength of the latter or otherwise impairing their efficient usage.

Various other objects of the invention will be apparent from the following description of the following suggested forms of the invention wherein:—

Fig. 1 is a side elevational view of a welding roller constructed in accordance with this invention illustrating its application;

Fig. 2 is a detail enlarged fragmentary side elevational view illustrating to advantage the ratchet wheel and its coacting mechanism; and Fig. 3 is a side elevational view of a modified form of the invention.

Referring to Figures 1 and 2, the roller 1 is moved in steps by means of the ratchet wheel 2 and the pawl 3, which latter is actuated from the eccentric 4 by means of the rod 5. This rod is attached to the pawl-carrying crank-like arm 12 of the shaft 8 not directly but by the mediation of a short rod 6 which is hinged to the end of the bar 5 and is arranged through a hub formed on the arm 12. The rod is adjustably secured in its position in the hub by a screw 7 to permit the position of the rod to be changed so that the extent of the angular movement of the arm 12 and, consequently, of the pawl 3, may be changed, whereby also the angular rotation of the roller electrode is correspondingly influenced. The extent of movement of the roller electrode may thus be adjusted according to any requirement.

Referring to Figure 3, the rod 5 is attached immediately to the pawl-carrying arm of the shaft 8, but it is bipartite, the two parts $5^a$, $5^b$ being connected by a sleeve 9 which is closed at one end and provided with an interior screw thread at the other end, this end forming a female screw which embraces a male screw provided at the corresponding end of the bar-half $5^b$. It is obvious that the length of the rod 5 may be changed, i. e. lengthened or shortened, by turning the sleeve 9 in one or the other direction whereby the extent of the angular movement of the arm 12 with its pawl 3 is changed, the effect with respect to the welding roller and the piece of material under treatment being the same as in the form of invention illustrated in Figs. 1 and 2. There is also a certain dead play within the sleeve 9 which may likewise be changed by turning the sleeve in one or the other direction.

11 is a contact piece affixed to the rod part $5^b$, and 10 is a contact arm which is engageable with said piece 10 when the pawl 3 makes its no-load movement. The parts 10 and 11 form parts of the welding current circuit which, thus, is closed when, as long as, the pieces 10 and 11 are in contact with each other. It is to be understood that the period of welding which is the period during which the electric circuit is closed may be diminished or lengthened by adjustment of the arm 6 in the form of invention shown in Fig. 1 of the drawings and by the adjustment of sleeve 9 in the form of invention shown in Fig. 3. Correspondingly the cooling periods between the welding periods may be protracted or diminished. This is accomplished without in any way changing the rate of speed of the driving apparatus.

Other modifications of the invention are possible in order to conform to various conditions or to satisfy the caprice of manufacturer or operator. However, I have herein described the principle involved in this invention and I am aware that various changes may be made in structure within the scope of the appended claims.

Having now described my invenion, what I desire to secure by a patent of the United States is:

1. In an electric seam welding machine, the combination, with a roller electrode and with the welding current circuit for the same, of means for turning said electrode in steps, and means for closing said circuit only during the interruptions of the rotary movement of the said electrode, for the purpose set forth.

2. In an electric seam welding machine, the combination, with a roller electrode and with the welding current circuit for the same, of means for rotating said electrode intermittently, and automatic means for closing said circuit only during the interruptions of the rotary movement of the said electrode, for the purpose as described.

3. In an electric seam welding machine, the combination, with a rotary electrode and with the welding current circuit of the same, of means for rotating said electrode in steps, and means for keeping said circuit closed only during the interruptions of the rotary movement of the said electrode, substantially as described.

4. In an electric seam welding machine, the combination, with a rotary electrode and with the welding current circuit for the same, of a shaft having said electrode affixed to it; a ratchet wheel upon said shaft; a pawl adapted to actuate said ratchet wheel, and means for carrying and operating said pawl; a contact piece adapted to be reciprocated in conformity with the pawl; a stationary contact piece so arranged as to be adapted to be touched by said other contact piece during the return movement of the said pawl, substantially as described.

5. In an electric seam welding machine, the combination, with a rotary electrode and with the welding current circuit for the same, of a shaft having said electrode affixed to it; means for turning said shaft intermittently; a stationary contact piece forming a part of said circuit and another contact piece forming also a part of said circuit and being reciprocated in conformity with the step movement of the said shaft with the electrode; the arrangement and combination of these parts being such that the said circuit is closed during the return movement of the means for turning the shaft, substantially and for the purpose as described.

6. In an electric seam welding machine, the combination, with a rotary electrode and with the welding current circuit of the same, of a shaft having said electrode attached to it; another shaft; means for constantly turning said latter shaft; means for turning the first-mentioned shaft intermittently from the said other one; a pair of electrodes inserted into said circuit, one of them being operated by the transmission means between the shafts so as to be brought in contact with the other one during the return movement of the transmission means, substantially as set forth.

7. In an electric seam welding machine, the combination, with a rotary electrode and with a welding current circuit for the same, of a shaft having said electrode secured to it; another shaft and means for continuously rotating it; means for transmitting the motion from said second shaft to the first and for changing the continuous rotation of the second shaft into intermittent motion of the first; a connecting bar forming a part of said transmission means; a contact piece attached to said bar; another contact piece so arranged with respect to said first contact piece as to close with it the circuit during the return movement of the said bar, substantially as described and shown.

8. In an electric seam welding machine, the combination, with a rotary electrode and with a welding current circuit for the same, of a shaft having said electrode attached to it; a ratchet wheel secured to said shaft; an arm also affixed to said shaft; a pawl carried by said arm and meshing with said ratchet wheel; a bore in the hub of the arm; a rod adapted to be displaced in said bore; means for securing said rod in its adjusted position; another shaft and means for continuously rotating the same; a connecting bar hinged to the said rod and being reciprocated from said other shaft; a contact piece affixed to said connecting rod; another contact piece arranged in the proximity of said first contact piece and closing said circuit during the return movement of the said pawl, substantially and for the purpose as described.

9. In an electric seam welding machine, the combination, with a rotary electrode and with a welding current circuit, of a rotary electrode, a shaft having said electrode secured to it, another shaft and means for continuously rotating it, a connecting rod moved to and fro by said other shaft, and means for turning the first shaft by said connecting rod; the said connecting rod consisting of two parts arranged in line, means for adjustably connecting the two parts with each other, a dead play provided in said latter means; a pair of contact pieces forming parts of said circuit and being brought in contact with each other whilst the said connecting rod performs its return movement, substantially and for the purpose as described.

In testimony whereof I affix my signature.

EDMUND SCHRÖDER.